DELAY GENERATOR

Filed Sept. 18, 1961 2 Sheets-Sheet 1

INVENTORS
ROBERT C. CARTER
RICHARD A. HERNDON
BY Moody and Antrim
AGENTS

INVENTORS
ROBERT C. CARTER
RICHARD A. HERNDON
BY Moody and Antrim
AGENTS 3,079,601

DELAY GENERATOR

Robert C. Carter and Richard A. Herndon, Richardson, Tex., assignors to Collins Radio Company, Cedar Rapids, Iowa, a corporation of Iowa Filed Sept. 18, 1961, Ser. No. 138,957
3 Claims. (Cl. 343—103)

This invention pertains to electrical timing circuits and especially to electrical timing circuits that are continuously adjustable for measuring precisely, slowly varying intervals between pulses of different received trains which have the same average repetition rate.

In the long-range navigational system known as Loran, signal pulses are radiated from a plurality of transmitting stations that are spaced up to a few hundred miles apart. The repetition rate of the pulses is determined by one of the stations which is identified as the master station. In response to the reception of the master signal, the other, or slave, stations transmit pulses which are delayed precisely a predetermined interval after the transmission of the master signal. The slave stations transmit in preassigned order, and the delays are determined so that reception of the transmitted signals is in the same sequence at any location of a receiving station.

At the receiving station, the intervals between successive master signals remain constant according to the repetition rate determined at the master transmitter. Likewise, the same intervals exist between successive signals from each of the slave stations. However the intervals between a master signal and the next signals from each of the slave stations is dependent upon the location of the receiving system relative to the transmitting sites.

The usual receiving system has means for re-creating the master and slave signals at the repetition rate of the transmitted signals and for synchronizing the re-created signals with the received signals. A measure of the delay between the re-created master signal and each of the re-created slave signals provides units of measurement for determining location.

According to this invention the system of measuring intervals between reception of pulses from the master station and reception of pulses from the slave station has been modified to include a commercially available compact switch or encoder. The encoder used in the particular system described herein converts rotary shaft positioning into electrical binary code output. This output is compared with the binary output from a counter which is counting time from reception of a master pulse. When the two binary outputs coincide, the signal corresponding to that of a particular one of the slave stations is locally generated and compared in phase with the incoming signal of that slave station. The phase of the locally generated signal is adjusted to be coincident with that of the corresponding received signal. Therefore, when the received signal and the locally generated signal are coincident, a reading derived from an indicator coupled to the shaft of the binary encoder corresponds to the delay interval between the reception of the master signal and the reception of the slave signal. In order to have sufficient information for radio location, a second reading is obtained from another encoder corresponding to signal from another slave transmitting station. The two readings are translated into the location of the navigation receiver by reference to a chart prepared for use relative to the particular transmitting stations.

In prior systems the circuits for measuring intervals between pulses have used several banks of rotary wafer switches accurately geared together. These switches cooperate with a counter to provide an output at a time determined by the position of the input shaft of the coupled switches. The time of the output of the counting circuit corresponds to the locally re-created signals. Through the use of a binary coincident circuit and a binary encoder as described herein, the special wafer switches and the several gear assemblies coupling the wafers are replaced by a compact binary encoder which has a special configuration of rotor and brushes for developing binary coded numbers. The encoder such as used in various computer and servo positioning systems is readily available.

An object of this invention is to provide a simplified arrangement for a pulse-timing system through the use of a coincident detector and a commercially available encoder.

The following description and the appended claims may be more readily understood with reference to the accompanying drawings in which:

Figure 1:
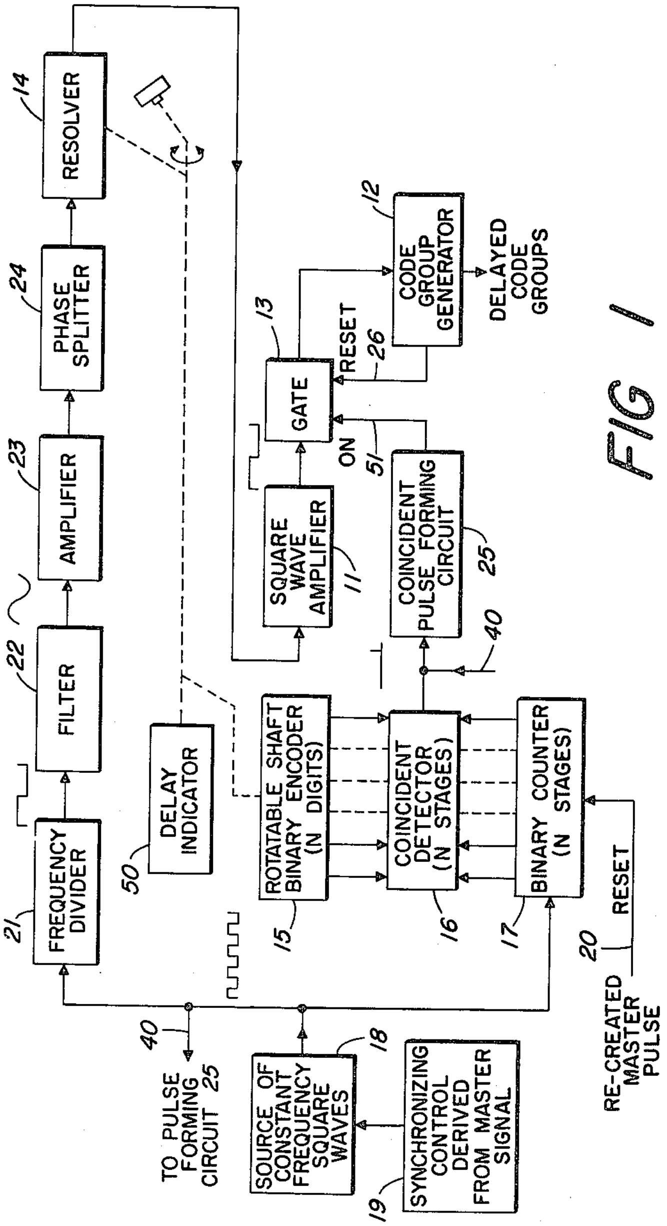
FIG. 1 is a block diagram of the pulse-timing circuits of this invention.

Briefly, the system determines accurately the interval between a master pulse which is applied to conductor 20 and the application of signal from square wave amplifier 11 to code group generator 12. At the end of a measured interval after the application of the master pulse, gate 13 is operated to its On state for conducting square wave signal to code group generator 12 and is reset to its nonconductive state in response to passage of a predetermined number of wave forms. The exact time of the final code after application of the master pulse is determined by the phase setting of resolver 14. Since the resolver repeats its measurements in intervals represented by a 360-degree phase shift of signal applied to its input, the measurement of time corresponding to more than one revolution of its shaft is provided by a counter 17 which counts in increments of less duration than the period of the signal applied to the resolver. The time of operation of gate 13 as measured by the counter for applying signal from resolver 14 is predetermined by the setting of the encoder 15 to apply a unique combination of voltages to coincident detector 16. An interval which is determined by this setting is measured by the counter 17 which counts in increments having durations equal to the periods of the signal which is applied to the input of the counter from source 18. When the combination of voltages on the output of counter 17 coincides with that combination set on encoder 15, coincident detector 16 provides a pulse for operating gate 13.

In detail, the source of signal 18 that supplies square waves at a constant frequency is connected to counter 17 and to the circuits that are connected to resolver 14. The phase of the square waves is synchronized with an incoming master signal by a synchronizing control system 19. The synchronizing system may be of the type that utilizes a servo system controlled by a discriminating circuit which is responsive to the received master signals and the re-created master signals. Intervals between corresponding points of the master signal are measured by a counter 17 which operates exactly through one complete cycle and resets itself within each interval. The re-created master signal is initiated by the operation of the counter so that the reset signal which is applied to the conductor 20 of counter 17 may be considered in this description a reference which corresponds to the time at which the timing of a delay interval between a master pulse and a slave pulse is started.

The counter operates in response to the application of the signal from source 18 to count successive intervals, each having a duration equal to the period of a complete cycle of the signal. The frequency divider 21 which supplies signal to resolver 14 divides the frequency of the signal to prevent ambiguity which might be caused if the increments of time counted by the counter 17 were the same length as the continuously variable period represented by one revolution of the shaft of the resolver 14. The ambiguity that might result from selection of either one of two continuously variable delay intervals is prevented by having the increments of time counted by the counter short enough to fall well within the delay interval of the resolver 14. The choice of frequency of the signal derived from source 18 is determined by the length of the interval that is to be measured and the accuracy that is required. A typical frequency that will be used in this example for long-range navigation equipment is 50,000 cycles per second to provide counts in 20-microsecond intervals.

The output of the source 18 is connected to the input of frequency divider 21, which in this example is a 5:1 divider for providing a 10,000-cycle per second square wave to the succeeding filter 22. The filter in response to the application of the square wave generates a sine wave of the same frequency for application through amplifier 23 to phase splitter 24. In the phase splitter the 10,000-cycle per second signal is divided in the usual manner into a pair of signals having equal amplitude and having a phase difference of 90 degrees. The output of the resolver 14 is changed in phase equal to the degrees of rotation of the shaft of the resolver so that a single complete rotation of the shaft corresponds to a delay in its output of 100 microseconds. The gear ratio coupling between the shaft of the resolver 14 and the shaft of the binary encoder 15 is chosen such that the encoder output is changed through five combinations of voltages while the shaft of the resolver operates through 360 degrees. As the shaft of the resolver is operated through a complete revolution corresponding to 100 microseconds of continuous delay, the encoder is operated through five 20-microsecond intervals.

The output of the resolver is applied through square wave amplifier 11 to the input of gate 13. The gate 13 is prepared for transmission of a series of square waves to the succeeding code group generator 12 in response to the application of a pulse from the coincident circuit 25 to the On control circuit of the gate. After the gate is prepared by the application of the pulse from the coincident circuit, it becomes conductive in response to the application of the next succeeding leading edge of the applied square wave to pass the waves. After the predetermined number of square waves have been counted in the code group generator, a reset signal is applied through conductor 26 for resetting gate 13.

The binary encoder 15 has a number of pairs of output conductors corresponding to the number of bits required by the highest number of intervals to be expressed in binary numbers. A change in the binary number is effected by interchanging two different predetermined levels of voltage between the pair of conductors corresponding to the bit that is required to be changed for the new number. The binary counter 17 has corresponding pairs of conductors for counting 20-microsecond intervals in the binary numbering system. The corresponding pairs of conductors of the binary encoder 15 and the binary counter 17 are connected to respective stages of coincident detector 16. When all of the voltages representing the different bits of the counter 17 match the voltages of the corresponding bits of the binary encoder 15, the coincident detector 16 operates to generate a pulse for preparing gate 13 to conduct delayed signal from the resolver 14 to the code group generator 12. The interval between the application of the master reset pulse to the counter 17 and the initiation of a slave code from group generator 12 is determined by the time delay measured in 20-microsecond intervals according to the binary number established by encoder 15 plus the delay provided by resolver 14. This delay time according to the position of the shaft of encoder 15 and the shaft of resolver 14 is displayed on delay indicator 50.

The encoder 15 has a rotor disk which is in engagement with different brushes corresponding to the different bits of binary numbers. The brushes are spaced radially for contacting the rotor disk at different respective diameters. The configurations of the conducting surfaces of the rotor at the different diameters are designed such that the electrical voltages applied through the brushes to the output conductors of the encoder correspond to successive binary numbers as the shaft of the encoder is rotated. The encoder may contain additional brushes and diode circuits to prevent ambiguous numbers as its shaft is rotated between positions for successive numbers. A suitable type of rotor and an arrangement of brushes for preventing ambiguity is described in the article "Disk Encoder Design Avoids Ambiguity" by Daniel P. Griffin, published in the April 22, 1960, issue of Electronics.

Figure 2:
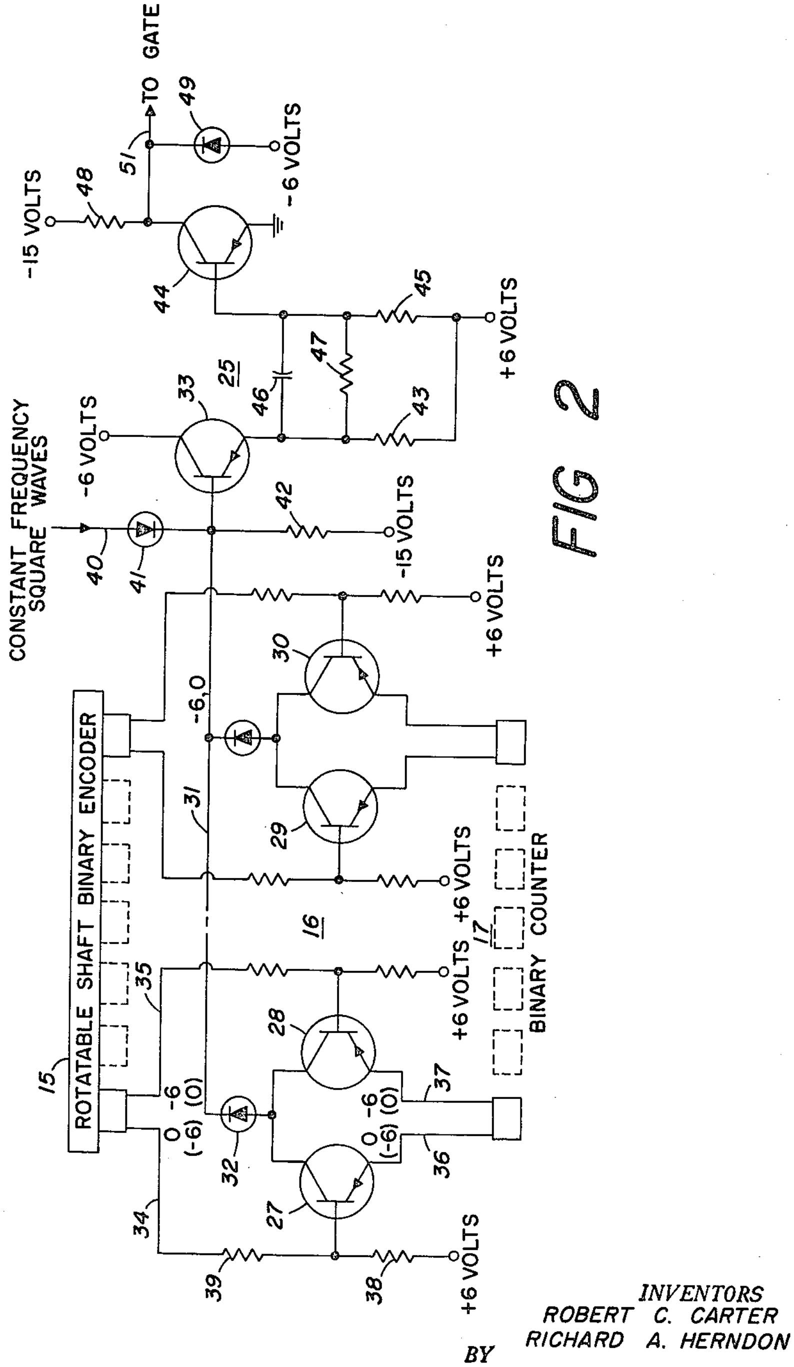
FIG. 2 is a schematic diagram of the coincident detector and the pulse-forming circuit shown in FIG. 1.

A satisfactory circuit arrangement for coincident detector 16 and the succeeding pulse-forming circuit 25 is shown in FIG. 2. The coincident detector has a number of stages corresponding to the number of bits in the highest required binary number. A first stage having a pair of transistors 27 and 28 and a last stage having a pair of transistors 29 and 30 are shown for determining the voltage on output conductor 31. The collectors of each of the pairs of the transistors contained within the coincident detector are connected through a respective diode to the common output conductor 31. For example, the collectors of transistors 27 and 28 are connected through diode 32 to the conductor 31. If none of the coincidence stages are conducting, conductor 31 is allowed to assume a negative potential due to the −15 volt supply and resistor 42. The magnitude of the negative potential will be limited to the anode potential of diode 41. The voltages that are applied from the binary encoder 15 and the counter 17 to a pair of transistors correspond to the same bit. That is, the most significant digit of the counter is compared through a coincident stage to the most significant digit of the encoder. When the voltages applied to a stage from the encoder and the counter do not correspond, one or other of the transistors is conductive so that zero voltage appears on output conductor 31.

The operation of the coincident detector 16 may be more clearly understood from the following detailed description. The base of each of the transistors in the coincident circuit is connected to an intermediate point of a voltage divider which is connected between a source of +6 volts and one of the output conductors of the encoder 15. For example, the base of transistor 27 is connected to the junction of resistors 38 and 39 which are connected between the source of +6 volts and the conductor 34 of the encoder 15. The other conductor of encoder 15 which is the complement of the same bit is connected to a voltage divider, which is connected to the base of the other transistor 28 of the same stage of the coincident detector. The conductors 36 and 37 of counter 17 which are for the same bit as conductors 34 and 35 respectively of encoder 15 are connected to the emitters of the respective transistors 27 and 28.

When the corresponding bits are alike, the voltages on the corresponding conductors of the respective bits of the encoder and the counter are the same and both transistors of the respective stage are non-conductive. For example, the voltage on conductors 34 and 36 may be considered to be zero, while the voltage on conductors 35 and 37 is −6 volts. When the voltage on conductor 34 is zero, the voltage which is applied from the junction of resistors 38 and 39 to the base of transistor 27 is approximately +2 volts. Then while the emitter is at zero volts, the transistor, which is a PNP type, is non-conductive. The voltage on the base of transistor 28 is approximately −2 volts, while the voltage on the emitter is −6 volts so that it too is non-conductive. Since the transistors in the stage of the coincident detector are connected in a symmetrical arrangement, it can be readily observed that the transistors are also non-conductive when −6 volts is applied to conductors 34 and 36 and zero volts is applied to conductors 35 and 37.

When the voltages applied to the conductor 34 has a different value from that applied to the corresponding conductor 36 and likewise when the voltage applied to conductor 35 differs from that applied to conductor 37, the respective transistor is conductive. Assume that −6 volts is applied to conductor 34 which is connected through resistor 39 to the base of transistor 27 and is applied also to the conductor 37 which is connected to the emitter of transistor 28, and that simultaneously zero volts is applied to conductor 35 which is connected through the respective voltage divider to the base of transistor 28 and is applied also to conductor 36 which is connected to the emitter of transistor 27. The base of transistor 27 is now at approximately −2 volts, while the emitter of the transistor is zero. Transistor 27 is now conductive and the voltage on conductor 31 is reduced to zero through diode 32, transistor 27, and conductor 36. Since −6 volts is applied to the emitter of transistor 28, transistor 28 is non-conductive and does not affect the voltage on the output conductor 31.

Normally, while counter 17 is operating to measure an interval after the application of a master pulse, at least one of the voltages applied to the output leads of the counter 17 does not correspond to the voltage applied to the corresponding output lead of the binary encoder 15. Therefore, during the interval prior to the time for formation of the slave pulse group, at least one of the transistors in the coincident detector is conductive so that the voltage on conductor 31 is maintained at zero. At the end of the interval that is determined by the setting of encoder 15, the voltages on respective conductors of the encoder 15 and counter 17 become coincident. Then, since all of the transistors of the coincident detector are non-conductive, conductor 31 is allowed to become negative by the application of voltage through resistor 42. This pulse of negative voltage is applied to the base of transistor 33. In order that the pulse might be formed sharply at a definite time as conductor 31 becomes negative, the source of constant frequency square waves 18 is connected through conductor 40 and diode 41 to the output of conductor 31 for application to the base of transistor 33. When all of the transistors of the coincident detector become non-conductive, the leading edge of a pulse being applied to conductor 40 is effective in sharpening the rise time of the negative pulse on conductor 31. Since the application of the square wave pulses from conductor 40 establishes definite timing of the negative pulse generated on conductor 31, the formation of the pulse is less subject to noise which might be derived from operation of the transistors, especially when coincidence is approached.

The emitter of transistor 33 is connected through resistor 43 and the base of transistor 44 is connected through resistor 45 to a source of +6 volts. The emitter of transistor 33 is coupled through capacitor 46 and parallel resistor 47 to the base of transistor 44. Thus, the negative pulse that is developed on the output conductor 31 in response to coincidence of voltages applied from the encoder 15 and counter 17 is coupled through the base-to-emitter circuit of transistor 33 and capacitor 46 to the base of transistor 44. The collector of the transistor 44 is connected through a resistor 48 to the source of −15 volts and is also connected through diode 49 to the source of −6 volts. The diode normally clamps the collector to the negative 6 volts source so as to maintain 6 volts on the collector. When the negative pulse is applied through the parallel capacitor 46 and resistor 47 to the base of transistor 44, transistor 44 rapidly becomes conductive so that the voltage on output conductor 51 rises rapidly in a positive direction to almost zero volts. This pulse of voltage enables gate 13 for applying the series of square waves to code group generator 12 as previously described.

A pulse-timing circuit according to the present invention provides means for accurately measuring extremely long delays between pulses. The delay between periodically received pulses is readily displayed on a usual mechanical counter having a rotary shaft input. In long-range distance measuring equipments, portions of the circuits shown in FIG. 1 are duplicated so that intervals between a master pulse and two succeeding slave pulses which originate at two different transmitting sites can be measured. In order to measure the interval between a master pulse and a second slave pulse, a second resolver is connected to the output phase splitter 24. Also an additional rotating shaft binary encoder corresponding to encoder 15 is mechanically coupled to the additional resolver. An additional delay indicator coupled to the added resolver and encoder displays the interval between the master pulse and the second slave pulse. An additional coincident detector that is required for the second binary encoder may be connected in parallel with coincident detector 16 to the output phase splitter 24. Also an additional rotatable shaft cuits corresponding to square wave amplifier 11, gate 13, and coincident pulse-forming circuit 25 are required. Logic circuits, which are not shown, connect the gates to the input of code group generator 12 and connect the output of code group generator 12 to the required discriminator circuits in the order in which the slave signals are received.

Although this invention has been described with respect to a particular embodiment thereof, it is not to be so limited, as changes and modifications may be made therein which are within the spirit and scope of the invention as defined by the appended claims.

We claim:

1. In a pulse-timing system for determining accurately the delay between application of first periodic pulses and generation of alternate second periodic pulses, said system including means for counting predetermined increments of delay from the time of application thereto of said first pulses to the time of generation of successive ones of said second pulses, and an adjustable phase shift means for interpolating between the increments of delay; said counting means responsive to the application of each of said first pulses for successively applying different combinations of electrical voltages at equal intervals to its output in a predetermined order, an adjustable encoder and a coincident detector, said encoder being adjustable for applying to its output any combination of voltages corresponding to any one of said combinations of said counter for a selected interval, the outputs of said encoder and said counter being applied to said coincident detector, an output circuit, means normally disabled for applying a signal from said phase shift means to said output circuit, and said coincident detector responsive to the application of said corresponding combinations for enabling said last mentioned means to apply to said output circuit signal after the start of the selected interval at a time dependent upon the adjustment of said phase shift means to generate each of said second pulses.

2. In combination with a phase shifter and a counter, a rotatable shaft encoder and a coincident detector, means for applying timing signal to said phase shifter and to said counter, said counter providing different combinations of output voltages corresponding to successive equal increments of delay, said phase shifter providing different periodic phases of signal to interpolate continuously between said increments of delay, said encoder having a shaft coupled to the shaft of said phase shifter, said shafts being rotatable together to any position corresponding to a respective predetermined delay so as to establish on the output of said encoder a combination of voltages corresponding to said combination provided by said counter for one of said increments within that period of said signal applied to said phase shifter which immediately precedes said predetermined delay, the outputs of said counter and said encoder being connected to said coincident detector, an output circuit, and means responsive to the simultaneous application of identical ones of said combinations from said counter and said encoder to said detector to initiate the application of signal from said phase shifter to said output circuit.

3. An accurate pulse-timing system for initiating pulse groups at intervals corresponding to those of incoming signals comprising, a binary counter of the type having cascaded bistable stages, means responsive to application of a master pulse synchronized with said incoming signal for resetting said counter to start an accurately timed interval, a source of signal of constant frequency connected to the input of said bistable stages of said counter, said counter being operated in response to application of said signal of constant frequency to provide a different combination of voltages on its output circuits according to successive binary numbers for each cycle of said signal which is applied to its input, a rotatable shaft encoder and a resolver, the respective shafts of said resolver and said encoder being coupled to provide predetermined phase relations, a delay indicator coupled to said shafts, different predetermined increments of rotational shaft positions of said encoder corresponding to different binary numbers, said rotatable shaft binary encoder in response to rotation in either direction of its shaft applying to its output circuits successively different combinations of voltages which for one direction of rotation correspond to the successive order of the combinations developed by said counter, a coincident detector, the outputs of said encoder and said counter being connected to said detector, a bistable gate, means responsive to the simultaneous application of identical combinations of voltage from said encoder and said counter to said coincident detector for developing a pulse to open said gate, a frequency divider, said source of signal being applied to said frequency divider, the output of said frequency divider being applied to said resolver, the output of said resolver which has a phase dependent upon the position of said shafts being applied to the input of said gate, means for maintaining said gate open to apply a predetermined number of pulses from said resolver through said gate, and said delay indicator displaying the delay between application of said master pulse and the initiation of said predetermined number of pulses.

No references cited.